United States Patent [19]
Yamaguchi et al.

[11] Patent Number: 5,937,432
[45] Date of Patent: Aug. 10, 1999

[54] ASSOCIATIVE STORAGE AND ASSOCIATIVE STORING METHOD

[75] Inventors: Isao Yamaguchi; Kazuhisa Ichikawa; Hiroshi Okamoto, all of Ashigarakami-gun, Japan

[73] Assignee: Fuji Xerox Co., Ltd., Tokyo, Japan

[21] Appl. No.: 08/806,937

[22] Filed: Feb. 26, 1997

[30] Foreign Application Priority Data

Feb. 26, 1996 [JP] Japan ................................. 8-037600

[51] Int. Cl.$^6$ .................................................. G06F 15/18
[52] U.S. Cl. ........................... 711/154; 711/128; 706/18; 706/23
[58] Field of Search ................................... 711/128, 154, 711/100; 706/25, 23, 27, 18; 365/49

[56] References Cited

U.S. PATENT DOCUMENTS

| | | | |
|---|---|---|---|
| 5,151,512 | 9/1992 | DiNinno et al. | 540/302 |
| 5,396,581 | 3/1995 | Mashiko | 395/24 |
| 5,515,477 | 5/1996 | Sutherland | 395/27 |
| 5,619,617 | 4/1997 | Furuta et al. | 706/25 |
| 5,640,494 | 6/1997 | Jabri et al. | 706/25 |
| 5,644,681 | 7/1997 | Takahashi et al. | 706/23 |
| 5,649,062 | 7/1997 | Teng et al. | 706/23 |
| 5,704,016 | 12/1997 | Shigematsu et al. | 706/41 |
| 5,712,959 | 1/1998 | Streit | 706/20 |

FOREIGN PATENT DOCUMENTS

| | | |
|---|---|---|
| A-62-277694 | 12/1987 | Japan . |
| A-8-161894 | 6/1996 | Japan . |

OTHER PUBLICATIONS

Parallel Distributed Processing: Exploration in the Microstructure of Cognition, Vol. 1: Foundations, David E. Rumelhart et al., pp. 318–362, 1986.

Computer Encyclopedia the Great (Konpyuta dai–hyakka in Japanese) pp. 959–961.

Rumelhart, David et al.; "Parallel Distributed Processing", MIT Press, pp. 319–363, 1996.

*Primary Examiner*—John W. Cabeca
*Assistant Examiner*—Pierre-Michel Bataille
*Attorney, Agent, or Firm*—Oliff & Berridge, PLC

[57] ABSTRACT

An associative storage includes: a plurality of storage elements having at least one internal signal outputting element for outputting an internal outputting signal toward another storage element and at least one internal signal inputting element for receiving an internal inputting signal outputted form another storage element, a learning signal inputting element for each respective storage element for inputting a learning signal thereto, a recalling signal inputting element for each respective storage element for inputting a recalling signal thereto, an internal state switching element for each respective storage element for turning an internal state of the respective storage element to an ON state when either the learning signal or the recalling signal is inputted thereto and/or the sum of the internal inputting signals exceeds a threshold value while the internal state is kept in an OFF state, wherein the internal state switching element outputs the internal signal towards another storage element when the internal state is turned ON, and an enhancing element for each respective internal signal inputting element for enhancing a signal transmitting efficiency thereof when the internal state of the storage element is turned ON and the internal signal inputting element receives the inputting signal from another storage element.

17 Claims, 14 Drawing Sheets

○ On-State Storage Element
◯ Off-State Storage Element
● Enhanced internal signal outputting element
○ Non-enhanced internal signal outputting element Recalling Signal (i)

Learning Signals (j,k)

Recalling Signal (i)

Learning Signals (i,j,k)

Storage Elements

Fig. 15

| | | |
|---|---|---|
| $\omega_{00} = 0.000$ | $\omega_{10} = 0.625$ | $\omega_{20} = 0.000$ |
| $\omega_{01} = 0.625$ | $\omega_{11} = 0.000$ | $\omega_{21} = 0.372$ |
| $\omega_{02} = 0.000$ | $\omega_{12} = 0.372$ | $\omega_{22} = 0.000$ |
| $\omega_{03} = 0.000$ | $\omega_{13} = 0.000$ | $\omega_{23} = 0.000$ |
| $\omega_{04} = 0.457$ | $\omega_{14} = 0.000$ | $\omega_{24} = 0.000$ |
| $\omega_{05} = 0.515$ | $\omega_{15} = 0.306$ | $\omega_{25} = 0.000$ |
| $\omega_{30} = 0.000$ | $\omega_{40} = 0.457$ | $\omega_{50} = 0.515$ |
| $\omega_{31} = 0.000$ | $\omega_{41} = 0.000$ | $\omega_{51} = 0.306$ |
| $\omega_{32} = 0.000$ | $\omega_{42} = 0.000$ | $\omega_{52} = 0.000$ |
| $\omega_{33} = 0.000$ | $\omega_{43} = 0.000$ | $\omega_{53} = 0.000$ |
| $\omega_{34} = 0.000$ | $\omega_{44} = 0.000$ | $\omega_{54} = 0.000$ |
| $\omega_{35} = 0.000$ | $\omega_{45} = 0.000$ | $\omega_{55} = 0.000$ |

Signal transmitting efficiency of respective
internal signal inputting element after learning process

Fig. 16

| Recalling Signals | Results of recalling |
|---|---|
| $R_0$ | $O_0 = 1.000$<br>$O_1 = 0.992$<br>$O_4 = 0.689$<br>$O_5 = 0.798$ |
| $R_1$ | $O_0 = 0.992$<br>$O_1 = 1.000$<br>$O_4 = 0.609$ |
| $R_2$ | $O_2 = 1.000$ |
| $R_3$ | $O_3 = 1.000$ |
| $R_4$ | $O_0 = 0.689$<br>$O_1 = 0.630$<br>$O_4 = 1.000$ |
| $R_5$ | $O_0 = 0.798$<br>$O_5 = 1.000$ |

Results of recalling

Fig. 17(a)

| | | |
|---|---|---|
| $\omega_{00} = 0.000$ | $\omega_{10} = 0.625$ | $\omega_{20} = 0.000$ |
| $\omega_{01} = 0.625$ | $\omega_{11} = 0.000$ | $\omega_{21} = 0.372$ |
| $\omega_{02} = 0.000$ | $\omega_{12} = 0.372$ | $\omega_{22} = 0.000$ |
| $\omega_{03} = 0.000$ | $\omega_{13} = 0.000$ | $\omega_{23} = 0.000$ |
| $\omega_{04} = 0.457$ | $\omega_{14} = 0.000$ | $\omega_{24} = 0.000$ |
| $\omega_{05} = 0.559$ | $\omega_{15} = 0.306$ | $\omega_{25} = 0.000$ |
| $\omega_{30} = 0.000$ | $\omega_{40} = 0.457$ | $\omega_{50} = 0.559$ |
| $\omega_{31} = 0.000$ | $\omega_{41} = 0.000$ | $\omega_{51} = 0.306$ |
| $\omega_{32} = 0.000$ | $\omega_{42} = 0.000$ | $\omega_{52} = 0.000$ |
| $\omega_{33} = 0.000$ | $\omega_{43} = 0.000$ | $\omega_{53} = 0.000$ |
| $\omega_{34} = 0.000$ | $\omega_{44} = 0.000$ | $\omega_{54} = 0.000$ |
| $\omega_{35} = 0.000$ | $\omega_{45} = 0.000$ | $\omega_{55} = 0.000$ |

Fig. 17(b)

| Recalling Signal | Results of recalling |
|---|---|
| $R_5$ | $O_0 = 0.860$<br>$O_1 = 0.539$<br>$O_5 = 1.000$ |

Results of additional learning

ASSOCIATIVE STORAGE AND ASSOCIATIVE STORING METHOD

BACKGROUND OF THE INVENTION

This invention relates to an associative storage and an associative storing method, and in particular to those capable of storing new associative memories additionally and self-organizably without any interference with previously stored associative memories.

In human memories, usually several events, such as words, are memorized being associated with each other. For example, if a word "apple" is associated with a word "red" and then the word "red" is associated with the word "traffic light", association is initiated by one event, "apple", and progressed thereafter such that "apple is red" and "red is traffic light". When humans memorize some events, such events are usually memorized as being associated with other events and are also automatically associated with previously memorized events.

As described in "Computer Encyclopedia the Great" (Konpyuta dai-hyakka in Japanese), pp959–961, an associative storage, which is able to store several events associating themselves with each other and output a previously stored event in response to an inputted event that has also been stored as being associated thereto, is known as one of prior associative storage. Furthermore, as an improved version of such kind of associative storage, and as disclosed in Japanese Unexamined Patent Publication (referred to as JP-A hereinafter) Sho. 61-277694, a new technology for preventing outstanding noises by executing a feedback on an output from a correlative matrix through a transposed matrix, on the associative storage is also known. However, in those prior methods, it is difficult to update stored associative relationships because those events must have been stored by defining the associative relationship among them beforehand.

Another method for performing unique associative storage is referred to as a back propagation method and is described in "PARALLEL DISTRIBUTED PROCESSING", 1986, MIT PRESS. This is the method for letting the associative storage "learn", i.e. updating the stored associative relationships, by using a neural network. In this method, since the associative storage is able to be learned using the neural network, this system is not as rigid as the aforementioned method using the correlative matrix. However, there is a drawback that it requires much time to learn associative relationships among events to update the same. In addition, since this system updates associative relationships by utilizing prearranged groups of events to be stored, it is also required to relearn the entire prearranged groups in order to add a new group to be memorized.

JP-A Hei. 8-161894, although not prior art, discloses an associative storage device utilizing a method for learning associative relationships among events by using associative storage elements capable of outputting an output signal only when two input signals are simultaneously inputted thereto and capable of storing such states of storage elements. In this associative storage, since the states of storage elements in which two signals are inputted simultaneously thereto is utilized for the learning process, the system is not so rigid as the aforementioned method using the correlative matrix. In addition, since a respective associative storage element itself memorize such state, this association storage device provides much more flexibility on editing groups of events to be stored compared to the associative storage using the neural network. However, in this device, since the associative relationships among events are established at the time of learning of the state of respective storage elements, it is still difficult to enhance associated relationships among previously stored events.

SUMMARY OF THE INVENTION

This invention was made in terms of the aforementioned issues. The object of the present invention is to provide an associative storage capable of continuously updating and enhancing previously stored associative relationships among events in a self-organizing concept by repeating a learning process.

Another object of the present invention is to provide an associative storage comprising: a plurality of storage elements having at least one internal signal outputting element for outputting an internal outputting signal toward another storage element and at least one internal signal inputting element for receiving an internal inputting signal outputted form another storage element; a learning signal inputting element for each respective storage element for inputting a learning signal thereto; a recalling signal inputting element for each respective storage element for inputting a recalling signal thereto; an internal state switching element for each respective storage element for turning an internal state of the respective storage element to an ON state when either the learning signal or the recalling signals is inputted thereto and/or a sum of the internal inputting signal exceeds a threshold value while the internal state is normally kept in an OFF state, the internal state switching element output the internal signal toward another storage element when the internal state is turned on; and an enhancing element for each respective internal signal inputting element for enhancing a signal transmitting efficiency thereof when the internal state of the storage element is turned on and the internal signal inputting element receives the inputting signal from another storage element.

DESCRIPTION OF THE DRAWINGS

FIG. 15 shows transmitting efficiencies of respective internal signal inputting elements after a learning process of one embodiment of the present invention.

FIG. 16 shows a result of the recalling process in one embodiment of the present invention.

FIG. 17(a) shows transmitting efficiencies of respective internal signal inputting elements after an additional learning process and FIG. 17(b) shows a recalling result thereafter.

DETAILED DESCRIPTION OF PREFERRED EMBODIMENTS

Figure 1:
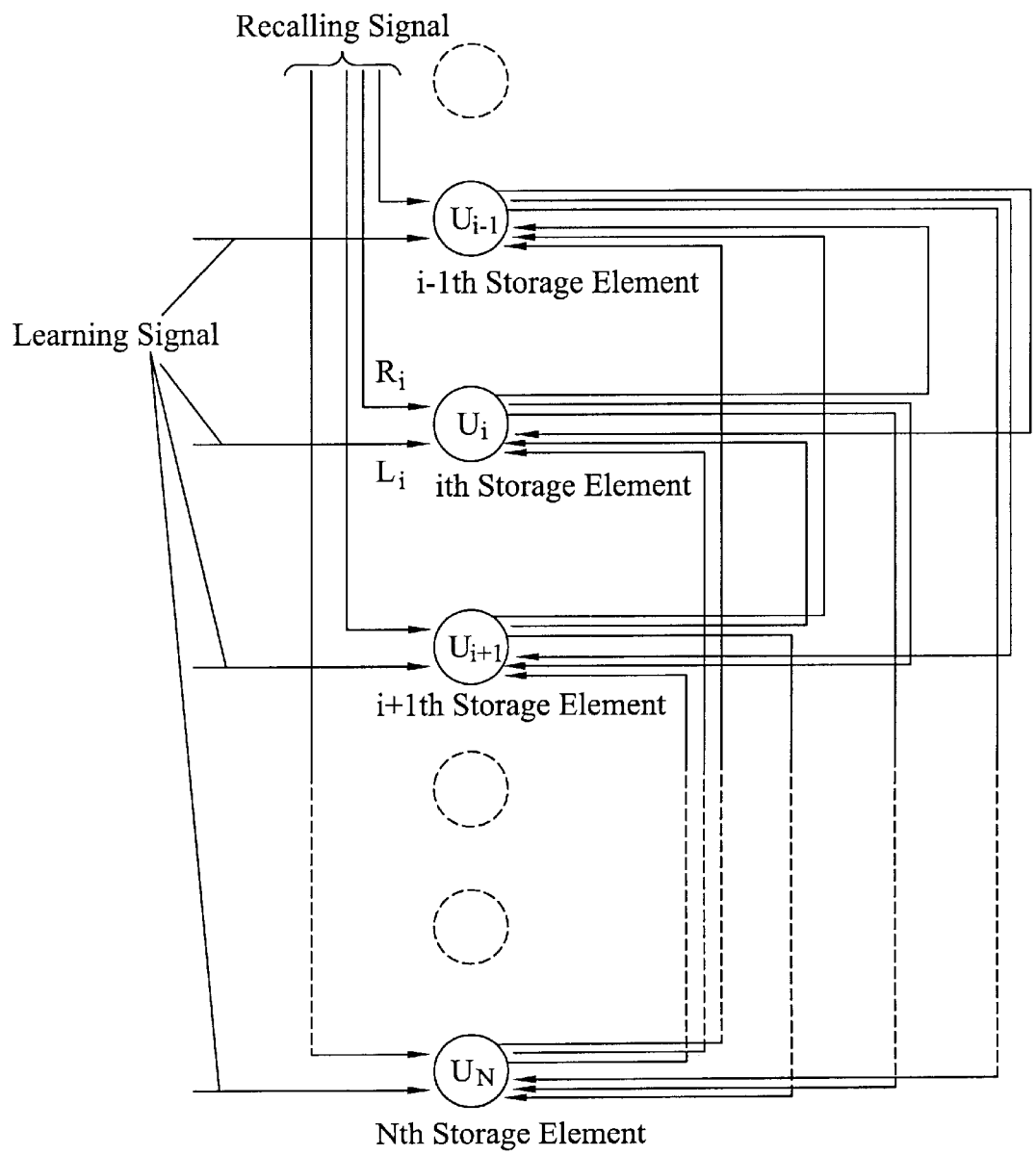
FIG. 1 is a structural view of one embodiment of the present invention.
Figure 2:
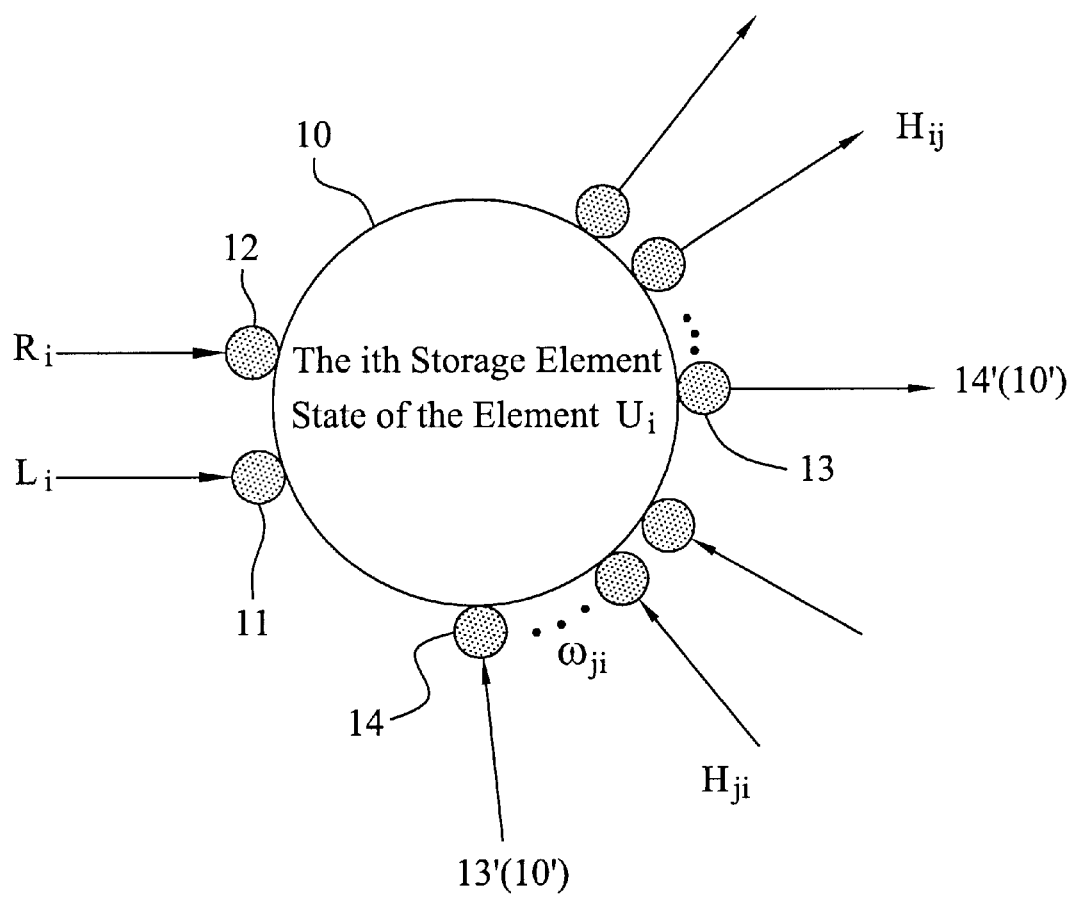
FIG. 2 is a structural view of the storage element of one embodiment of the present invention.

FIG. 1 is a block diagram of one example of the associative storage of the present invention. FIG. 2 is a structural figure of the storage element 10 disclosed in FIG. 1. The associative storage is constituted by a number N storage elements in this example. The basic principle of the function of the present invention is explained hereinafter by referring to FIG. 1 and FIG. 2.

A typical storage element used for the present invention is explained hereinafter by referring to the i-th storage element 10 in FIG. 2. As shown in FIG. 2, the i-th storage element 10 comprises a learning signal inputting element 11 for receiving a learning signal, a recalling signal inputting element 12 for receiving a recalling signal, at least one internal signal outputting element 13 for outputting an internal signal toward another storage element and at least one internal signal inputting element 14 for receiving an internal signal from another storage element. One internal signal outputting element 13 on the storage element 10 is coupled to one internal signal inputting element 14' on another storage element 10' and one internal signal inputting element 14 on the storage element 10 is coupled to one internal signal outputting element 13' on another storage element 10', respectively. One storage element is corresponding to one event to be stored, for example, a name of an event or a property thereof. The i-th storage element 10 has an element state Ui and the i-th storage element is capable of receiving a learning signal $L_i$ through the learning signal inputting element 11 and receiving a recalling signal $R_i$ through the recalling signal inputting element 12. Although the i-th storage element 10 is normally maintained in an OFF-state having a certain value of $U_i$, if the i-th storage element receives a signal through either the recalling signal inputting element 12 or the learning signal inputting element 11, the value of $U_i$ will be changed in response thereto. And if the value Ui satisfies a certain condition, i.e. exceeds a certain value, the i-th storage element 10 turns to an ON-state and outputs an internal signal $H_{ij}$ toward the j-th storage element through the internal signal outputting element 13. On the contrary, when an internal signal $H_{ji}$ from the j-th storage element to the i-th storage element reaches the internal signal inputted element 14 of the i-th storage element 10, the magnification of the inputted signal $H_{ji}$ is converted into a signal having a magnification of $H_{ji} \times \omega_{ji}$ through the internal signal inputted element 14 and finally inputted to the i-th storage element, wherein the value $\omega_{ji}$ is the signal transmitting efficiency of the internal signal inputting element 14, which is coupled to the internal signal outputting element of the j-th storage element, of the i-th storage element 10. The value of signal transmitting efficiency $\omega_{ji}$ of the internal signal inputted element 14 is set to be updated for a value of $\Delta\omega_{ji}$ in response to values of $U_i$ and $H_{ji}$ when a learning process is executed. The association between the i-th storage element and the j-th storage element is determined as strong as the value $W_{ji}$ increases.

The strong association means that an associative relationship of names or properties of events stored to respective storage elements are strong. During a learning process, names or properties of events having a strong associative relationship are respectively inputted to plural storage elements simultaneously as learning signals and the associative relationships of inputted names or properties of events are enhanced and stored in the associative storage. During a recalling process, names or properties of events are inputted to one storage element as a recalling signal and the recalling signal makes the storage element turn to an ON-state, then other storage elements that have been enhanced in associative relationship with the ON-state storage element are also turned to the ON-state in sequence. At this time, names or properties of events stored to those ON-state storage elements are defined as recalled ones during the recalling state.

The learning process utilizing the associative storage disclosed in FIG. 1 is explained in detail hereinafter. As mentioned before, normally, both states $U_i$ and $U_j$ of the i-th storage element and j-th storage element are set to be in the OFF-state. Then, when a learning signal is inputted to respective storage elements simultaneously, the states of both the i-th and j-th storage elements turn to the ON-state. During a learning process, learning signals are inputted to plural storage elements simultaneously.

Learning signals $L_i$, $L_j$ are inputted to the i-th storage element and the j-th storage element respectively through respective learning signal inputting elements. Both the i-th and j-th storage elements turn to the ON-state by learning signals $L_i$ and $L_j$, then both the i-th and j-th storage elements output an internal signal through respective internal signal outputting elements toward other storage elements. For example, the internal signal $H_{ik}$ is outputted from the i-th storage element to the k-th storage element and the internal signal $H_{jk}$ is outputted from the j-th storage element to the k-th storage element, respectively. Now considering the i-th storage element, the i-th storage element is in the ON-state and receives the internal signal $H_{ji}$ from the j-th storage element. At this time, the signal transmitting efficiency $\omega_{ji}$ of the internal signal receiving element 14, which receives the internal signal $H_{ji}$ from the j-th storage element, of the i-th storage element is updated by the following equation:

$$\omega_{ji}(t)=\omega_{ji}(t-1)\times\Delta\omega_{ji} \tag{1}$$

wherein the $\omega_{ji}$ (t−1) is the signal transmitting efficiency before the updating and the $\omega_{ji}$ (t) is the efficiency after the updating. The signal transmitting efficiency is directed to be enhanced by this updating. The updated magnitude of the signal transmitting efficiency is defined $\Delta\omega_{ji}$.

The magnitude of the $\Delta\omega_{ji}$ may be set to be constant at every learning process, otherwise, it may be varied based on the value of $\omega_{ij}$ (t−1). In this embodiment, the transmitting efficiency $W_{ji}$ is set so that the value $W_{ji}$ is enhanced in proportion to the value of $\omega_{ji}$ (t−1). In other words, when the value of $\omega_{ji}$ (t−1) is relatively large, the value $\Delta\omega_{ji}$ is set to be relatively small and when the value of $\omega_{ji}$(t−1) is relatively small, the value $\Delta\omega_{ij}$ is set to be relatively large. According to this method, since the value $\omega_{ji}$ is drastically enhanced in the case when the value itself have never been enhanced in previous learning process, the associating relationship among storage elements is also drastically enhanced; in addition, once the value $\omega_{ji}$ is enhanced, the value is still enhanced constantly in succeeding learning processes in proportion to a number of learning processes. Thus, the associative storage is able to execute learning processes by enhancing the signal transmitting efficiency of respective internal signal inputting elements of respective storage elements.

The recalling process of the associative storage device shown in FIG. 1 is explained in detail hereinafter. Different from the previously mentioned learning process, now, we assume that only one storage element, i.e. the i-th storage element, receives a recalling signal at one time. A recalling signal $R_i$ is inputted through the recalling signal inputting element 12 of the i-th storage element. When the recalling signal $R_i$ is inputted to the i-th storage element 10, the i-th element turns to the ON-state and outputs internal signals through the internal signal outputting elements 13 towards other storage elements. For example, the internal signal is defined as $H_{ik}$ when the signal is outputted from the i-th storage element to the k-th storage element. Since the signal transmitting efficiency of the internal signal receiving element of the k-th storage element when the k-th storage element receives the internal signal $H_{ik}$ from the i-th storage element is defined as $W_{ik}$, the k-th storage element receives an input signal having a magnitude of $H_{ik} \times \omega_{ik}$. When the magnitude of the $H_{ik} \times \omega_{ik}$ is sufficient to make the k-th storage element switch to the ON-state, the k-th storage element turns to the ON-state and outputs internal signals through internal signal outputting elements towards other storage elements. Otherwise, when the intensity $H_{ik} \times \omega_{ik}$ is not sufficient to make the k-th storage element switch to the ON-state, the k-th storage element does not turn to the ON-state and does not output any signals therefrom. Therefore, if a recalling signal is inputted to the i-th storage element and plural storage elements turn to the ON-state in response to internal signals outputted from the i-th storage element, an anonymous storage element may receive plural internal signals from other ON-state storage elements. In this situation, the state of the anonymous storage element may be set to be changed in response to the sum of inputted internal signals. For example, as an anonymous storage element, the k-th storage element may receive an input $I_k$ defined by the following equation:

$$I_k = \sum_{i \neq k} H_{ik} \times \omega_{ik} \qquad (2)$$

wherein, $I_k$ is the sum of all internal signals inputted to the k-th storage element through all internal signal inputting elements of the k-th storage element. If the i-th storage element 10 is the OFF-state and it does not output any internal outputting signals towards other storage elements and the magnitude of the $H_{ik}$ is 0, the value $I_k$ is always determined by the equation (2). Therefore, in the recalling process, the state of the k-th storage element $U_k(t)$ at the timing t is defined by the following equation:

$$U_k(t)=f(I_k(t-1)) \qquad (3)$$

wherein, $I_k(t-1)$ is the sum of all internal signals at the timing t−1.

The function f(x) may be any function capable of turning the state of $U_k(t)$ ON in a specific condition based on the magnitude of the $I_k(t-1)$. For example, a threshold-type function that the state $U_k(t)$ is turned ON when the $I_k(t-1)$ exceeds a certain threshold value θ and is kept in the OFF-state in other situations may be plausible. When the state of the k-th storage element is turned ON based on the equation (3), the k-th storage element 10 outputs an internal signal through the internal signal outputting element towards other storage elements. The intensity of the outputted internal signal through from the internal signal outputting elements of the k-th storage element towards other storage elements is defined by the following equation:

$$O_k(t)=g(U_k(t-1)) \qquad (4)$$

Wherein, the function g(x) may be any monotone increasing function such as g(x)=x.

If the value $\omega_{ik}$ in the equation (2) is enhanced during the learning process, since the magnitude of the $H_{ik} \times \omega_{ik}$ is also increased, the chance of turning on of the k-th element is also increased according to the relationship in equation (3). In other words, if a recalling signal is applied to at least one of storage elements that have been enhanced in associative relationship with each other during the previous learning process, since those enhanced storage elements are easily turned to the ON-state, names or properties of events stored in those ON-state storage elements are recalled in connection with the names or properties of the event associated to the inputted recording signal. Thus, the associated storage is able to associate by using the updated signal transmitting efficiency, which has been enhanced during the previous learning process, of the internal signal inputting elements of respective storage elements. If the magnitude $\Delta\omega_{ji}$ in the equation (1) is not sufficiently enhanced and associative relationship among storage elements are not enhanced sufficiently to execute the following recalling process by a single learning process, the associative relationship among storage elements may be enhanced by repeating the same learning process to those storage elements.

Figure 3:
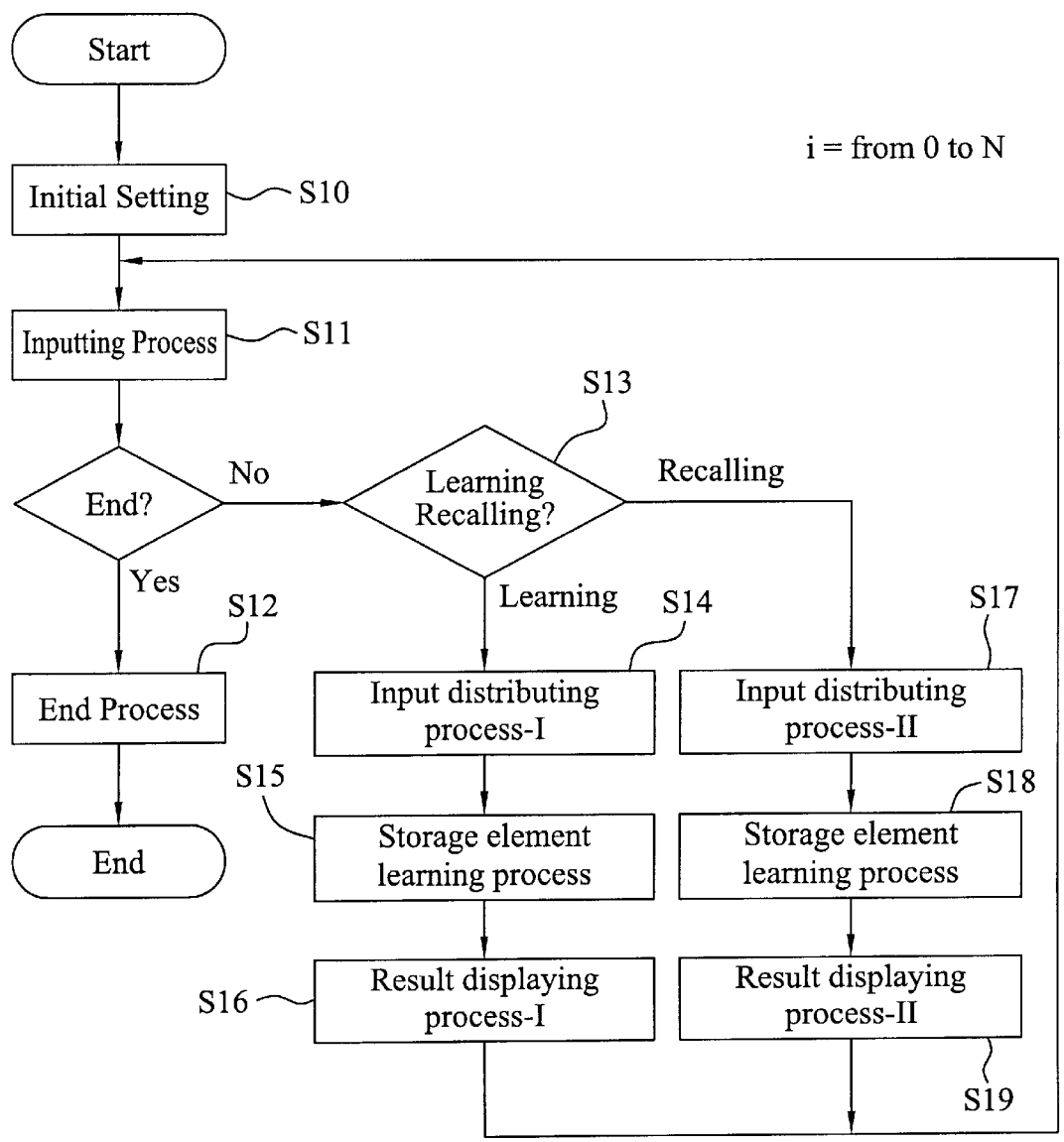
FIG. 3 is a flow chart showing an exemplary structure of the storage element as a form of software.

The structuring example of respective storage element is explained hereinafter. FIG. 3 shows an example when the storage element is configured as a software. As shown in FIG. 3, in this process, an initializing step is executed for holding variables $H_{ij}$, $\omega_{ij}$, $O_i$ and $U_i$. If it is necessary, certain values are read out and set thereto at this step (S11). Then an input signal is inputted thereto by a user (S12). The inputted signal is one of the learning signal, or the recalling signal or the end signal. If the inputted signal is the end signal, data are stored and the valuables $H_{ij}$, $\omega_{ij}$, $O_i$ and $U_i$ are cleared. Otherwise, the inputted signal is checked whether it is the learning signal or the recalling signal (S13). If the input signal is determined to be the learning signal, input distributing process-I, learning process for storage element and result displaying process-I are executed (S14, S15 and S16), otherwise, if the inputted signal is determined to be the recalling signal, input distributing process-II, recalling process for storage element and result displaying process-I are executed (S17, S18 and S19). The input distributing processed includes a process for converting the inputted event, i.e. a word to be stored, into a learning signal $L_i$ for the i-th storage element. The input distributing process-I includes a process for converting the inputted event, i.e. a word to be memorized, into a recalling signal $R_i$ for the i-th storage element. The result displaying processed includes a process for displaying a learned results, i.e. associatively stored events by the learning process. The result displaying process-II includes a process for displaying a result of recalled events by the recalling process.

Figure 4:
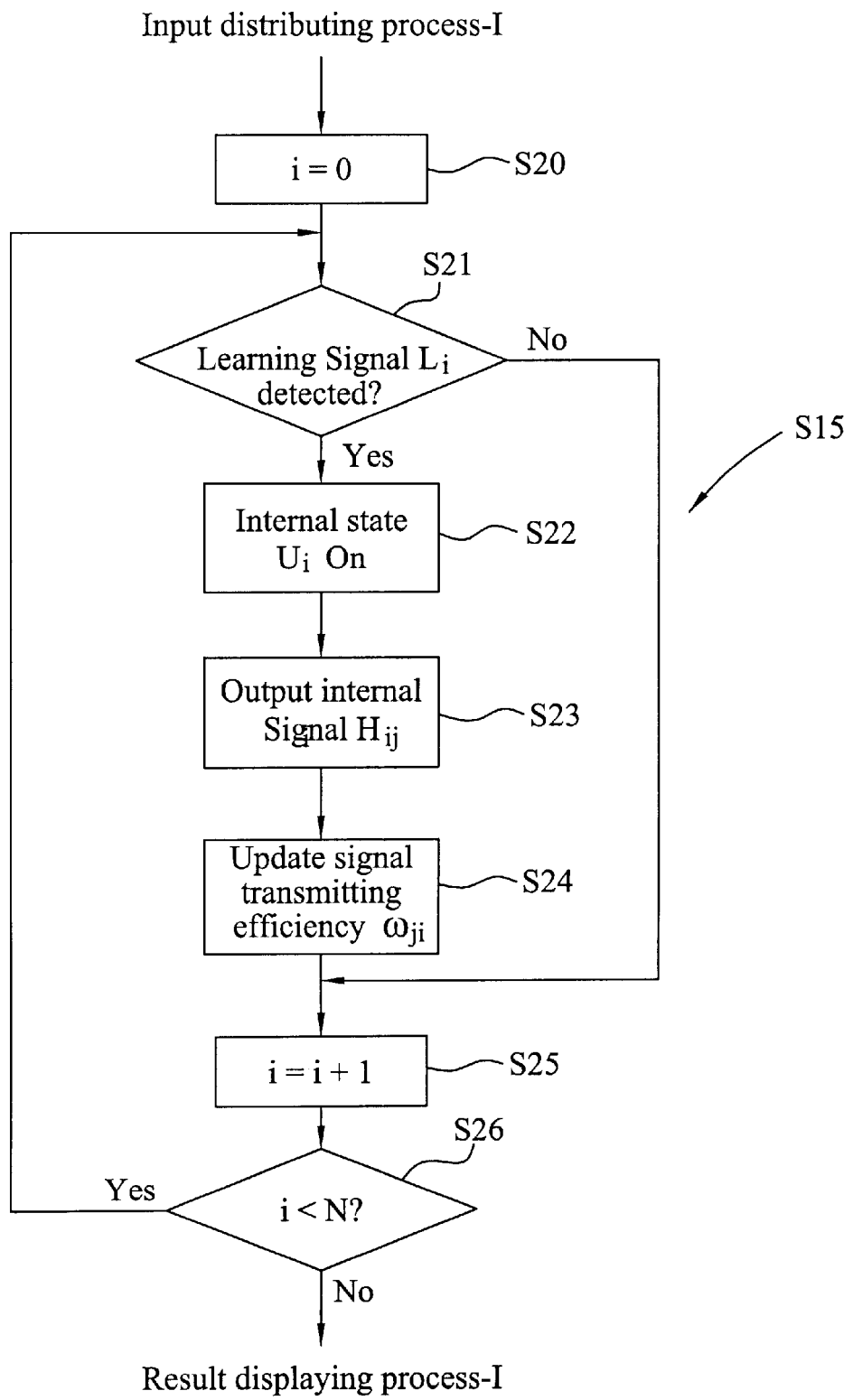
FIG. 4 is a flow chart showing details of a part of the flow chart in FIG. 3.

FIG. 4 shows detailed steps within the learning step (S15) in FIG. 3. As shown in this figure, the existence of the learning signal $L_i$ for respective storage element is detected by repeating steps S20, S21, S25 and S26 for the respective i-th storage element. If the learning signal $L_i$ exists, the internal state $U_i$ is turned to the ON-state and the internal signal $H_{ij}$ is outputted (S22, S23). After that, if internal signal from the j-th storage element exists, the signal transmitting efficiency $\omega_{ji}$ of the internal signal inputting element 14 is updated by using the equation (1).

Figure 5:
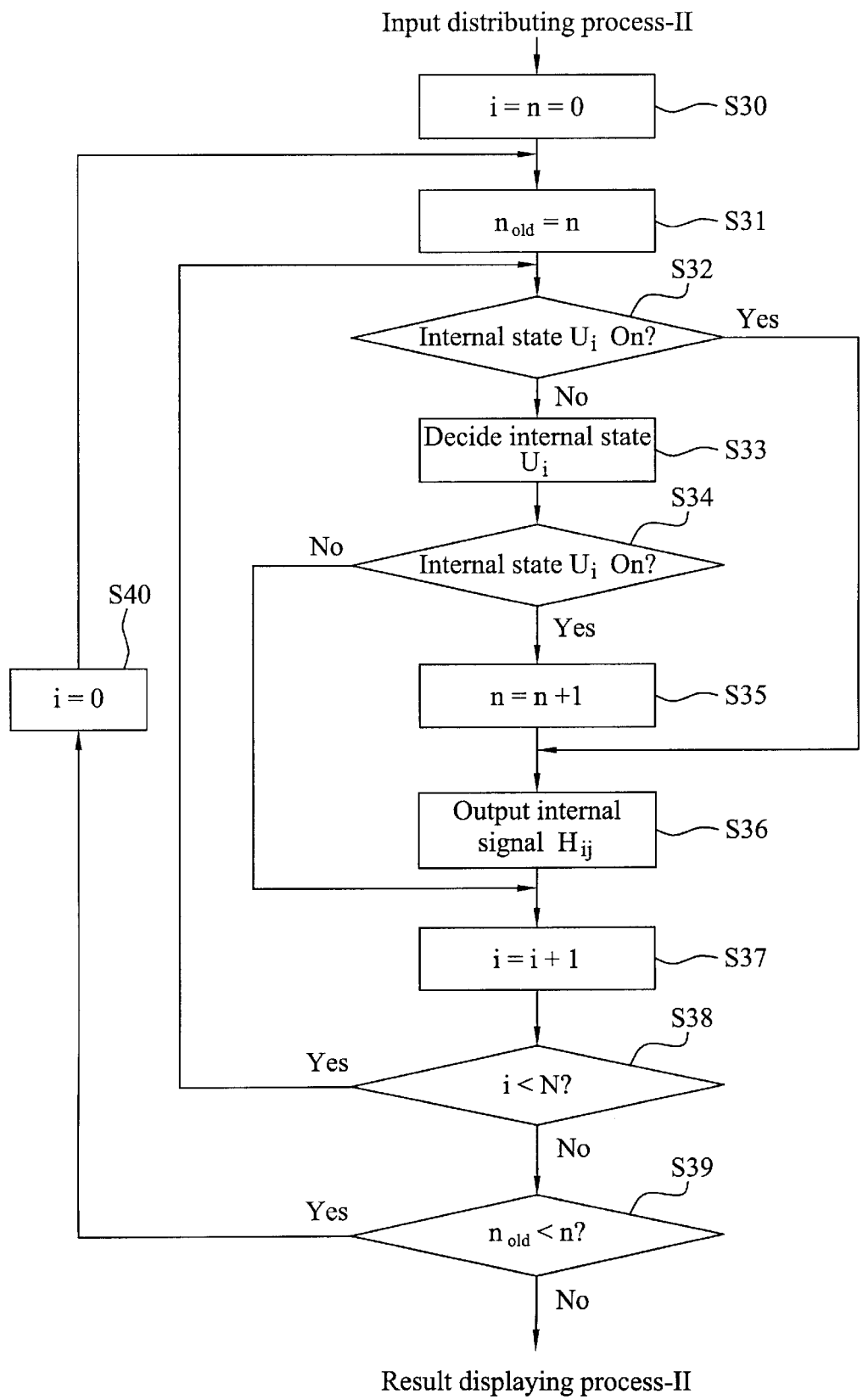
FIG. 5 is a flow chart showing details of another part of the flow chart in FIG. 3.

FIG. 5 shows detailed steps within the recalling process (S18) for respective storage element, the initialization is primarily executed (S30). In this figure, the symbol i is the number of subjected storage elements and the symbol n is a number of recalled events. The number of recalled events $n_{old}$ during the previous recalling loop is also initialized (S31). Then the internal state of the subjected i-th storage element is determined whether it is already set to the ON-state or not (S32). If the internal state is already set to the ON-state, the internal signal $H_{ij}$ is outputted and the same steps are repeated for respective storage elements until the number i of the storage element becomes number N (S36, S37 and S38). If the internal state of the i-th storage element is not set to the ON-state yet (S32), the internal state $U_i$ is determined by using the equations (2) and (3) (S33), and if the determined internal state $U_i$ is still the OFF-state, then go to step 37; otherwise, if the determined internal state $U_i$ is turned to the ON-state, the internal signal $H_{ij}$ is outputted (S35, S36) with adding 1 to value n and go to step S37.

In the step S39, it is determined whether any storage elements are newly determined as in the ON-state or not, in other words, whether the value n is larger than the value $n_{old}$ or not, and if it is, the steps S31 through S39 are repeated by resetting the number i to zero (S40).

Thus, a learning process is executed by updating the signal transmitting efficiency in response to the input of the learning signal $L_i$, and newly turned-ON storage elements in response to the input of the recalling signal $R_i$ are also detected as a recalling process.

Figure 6:
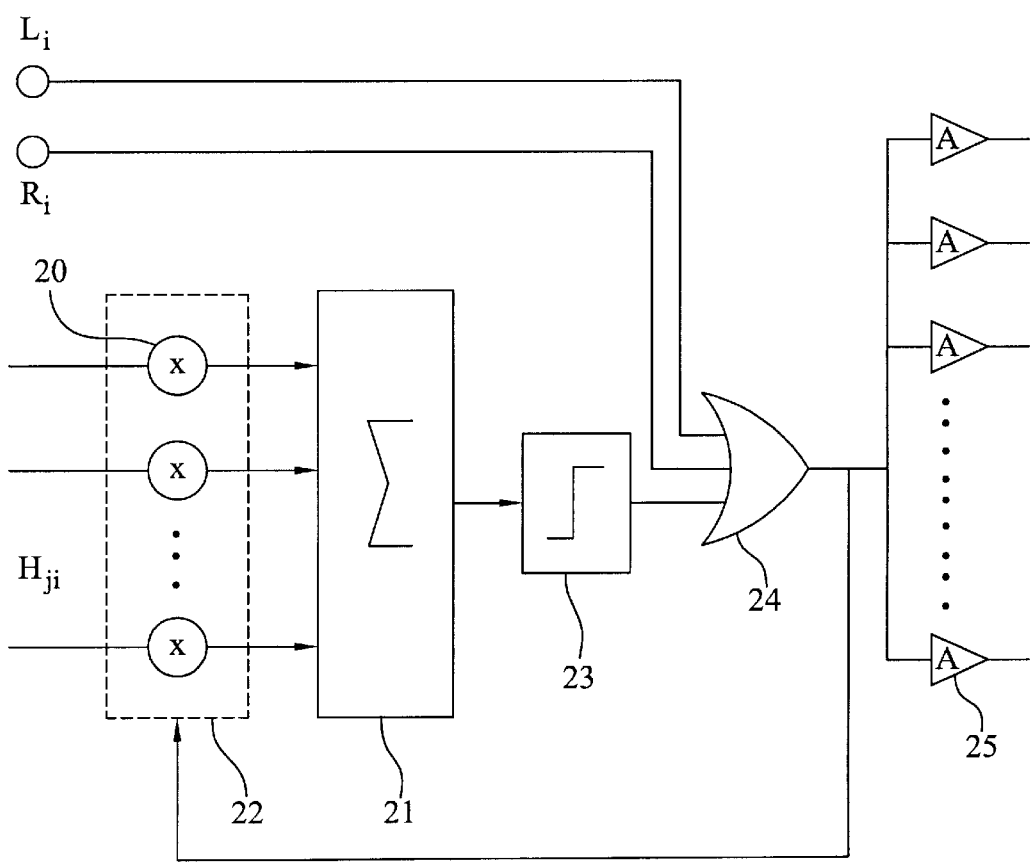
FIG. 6 is a block diagram showing an exemplary structure of the storage element as a form of hardware.

FIG. 6 shows an example of the storage element as a hardware. In this figure, the internal signal $H_{ji}$ outputted form the j-th storage element is inputted into the adder 21 through the multiplier 20 having a transmitting efficiency $\omega_{ji}$. The transmitting efficiency $\omega_{ji}$ of the multiplier 20 is updated by the transmitting efficiency controlling device 22. The output signal from the adder 21 is classified in several levels by the level detector 23 and provided into the OR circuit 24. The learning signal $L_i$ and the recalling signal $R_i$ are provided to other terminals of the OR circuit 24. The output signal from the OR circuit 24 is provided to another storage element 25 as an internal signal and also inputted to the signal transmitting efficiency controlling device 22 in order to update the signal transmitting efficiency $\omega_{ji}$ of the multiplier 22, which receives the internal signal. In this configuration, the signal transmitting efficiency is able to be updated in response to the learning signal $L_i$ for the learning process and recalling of the associatively stored events is executed in response to the recalling signal Ri.

Figure 7:
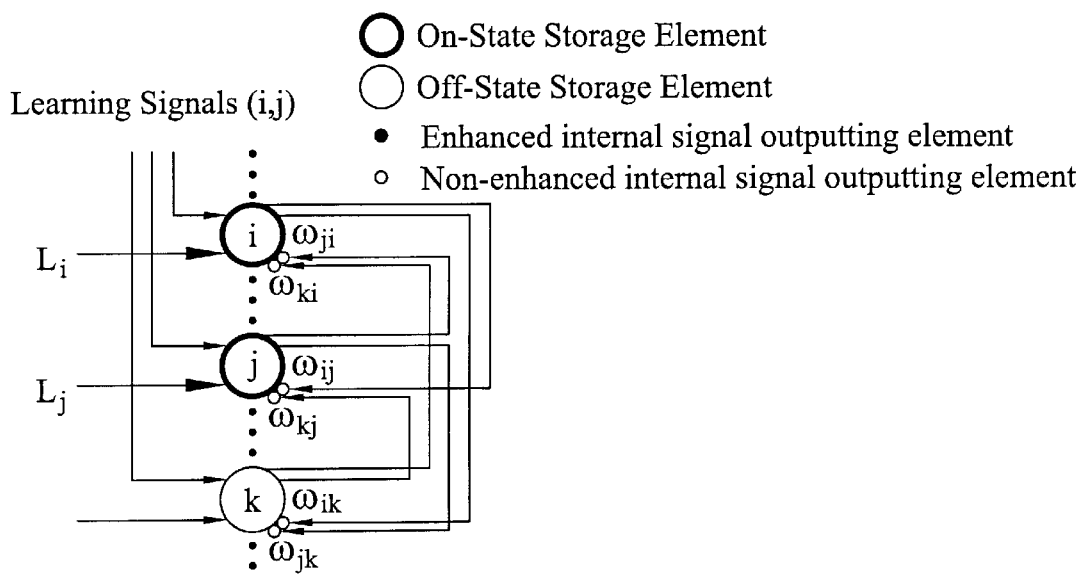
FIG. 7 shows a functional principle of one embodiment of the present invention.
Figure 8:
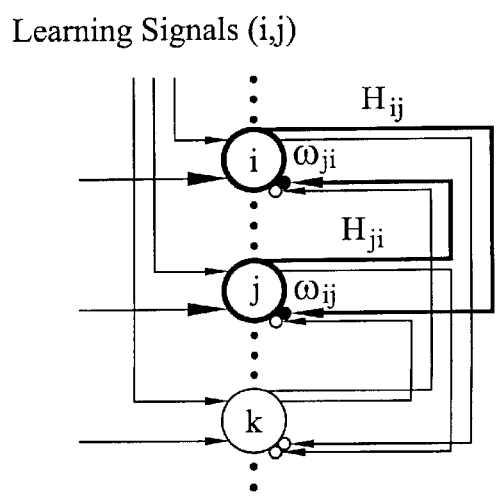
FIG. 8 shows a functional principle of one embodiment of the present invention.

Next, the actual learning and recalling processes of the associative storage are explained. FIGS. 7 through 12 are explanatory views for the learning and recalling processes of one embodiment of the associative storage of the present invention. In those Figs., only the i-th, j-th and k-th storage elements among all number N storage elements are indicated for the simple explanation purpose. At this time, it is assumed that words are stored into respective storage elements as the names or properties of events. Firstly, as shown in FIG. 7, learning signals $L_i$ and $L_j$ are inputted to the i-th and j-th storage elements, respectively. Then, the i-th and j-th storage elements are turned to the ON-state and output internal signals through respective internal signal outputting elements towards other respective storage elements. Next, as shown in FIG. 8, since both the i-th and j-th storage elements are in the ON-state and are receiving an internal signal from the other storage element each other, both signal transmitting efficiency $\omega_{ji}$ and $\omega_{ij}$ of respective internal signal inputting elements are enhanced respectively in accordance with the equation (1). Therefore, an associating relationship between the words stored in the j-th storage element and the i-th storage element is enhanced.

Figure 9:
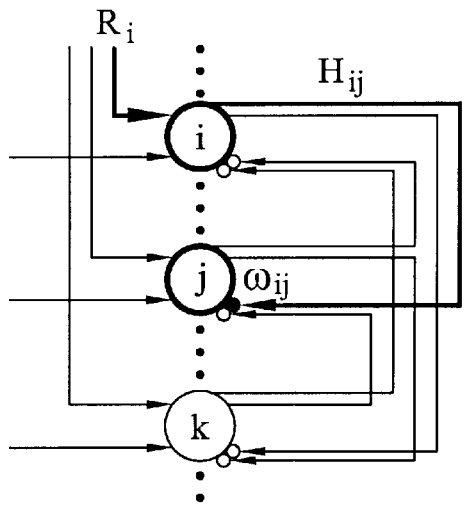
FIG. 9 shows a functional principle of one embodiment of the present invention.

As shown in FIG. 9, if a recalling signal $R_i$ is inputted to the i-th storage element, the i-th storage element turns to the ON-state and outputs an internal signal through the internal signal outputting element toward other storage elements. As explained in FIGS. 7 and 8, the signal transmitting efficiency of the j-th storage element had been enhanced corresponding to the internal signal from the i-th storage element, the j-th storage element turns to the ON-state in response to the input signal of $H_{ij} \times \omega_{ij}$. In other words, the associative storage is able to recall the word that has been stored in the j-th storage element as well as the word that has been stored in the i-th storage element by being inputted by a word corresponding to the word stored in the i-th storage element.

Figure 10:
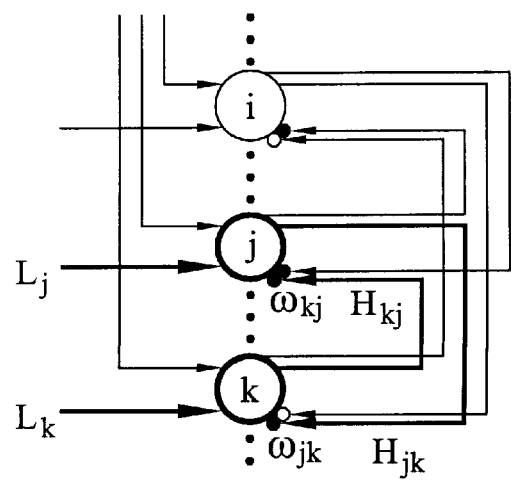
FIG. 10 shows a functional principle of one embodiment of the present invention.

Then, when learning signals $L_j$ and $L_k$ are inputted to the associative storage as shown in FIG. 10, as similar to the case shown in FIGS. 7 and 8, the respective signal transmitting efficiency $\omega_{kj}$ and $\omega_{jk}$ of respective internal signal inputting elements of the j-th and i-th storage elements are also enhanced. Thus, the associative relationship between the words stored in the j-th and k-th storage elements is also enhanced.

Figure 11:
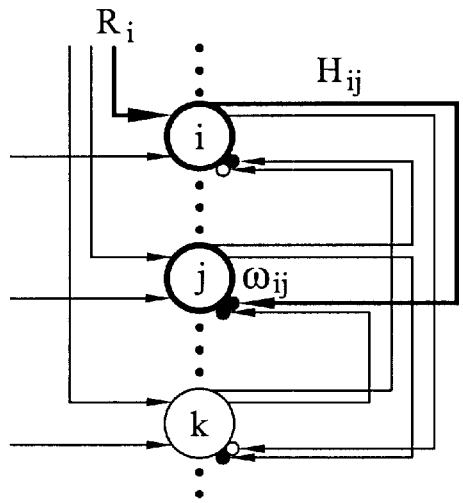
FIG. 11 shows a functional principle of one embodiment of the present invention.
Figure 12:
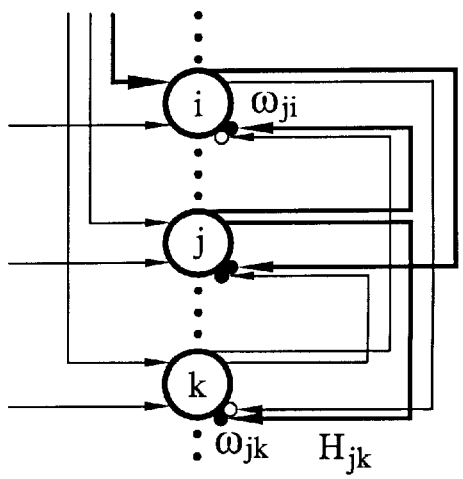
FIG. 12 shows a functional principle of one embodiment of the present invention.

When the association between the j-th and k-th storage elements is enhanced, if a recalling signal $R_i$ is re-inputted to the i-th storage element, as shown in FIG. 11, the j-th storage element turns to the ON-state again as similar to that of FIG. 9. Then, as shown in FIG. 12, the k-th storage element also turns to the ON-state in response to the internal signal from the j-th storage element. Thus, respective words stored in the i-th, j-th and k-th storage elements are recalled in sequence. The above mentioned process is the learning and recalling process of the associative storage of the present invention.

Figure 13:
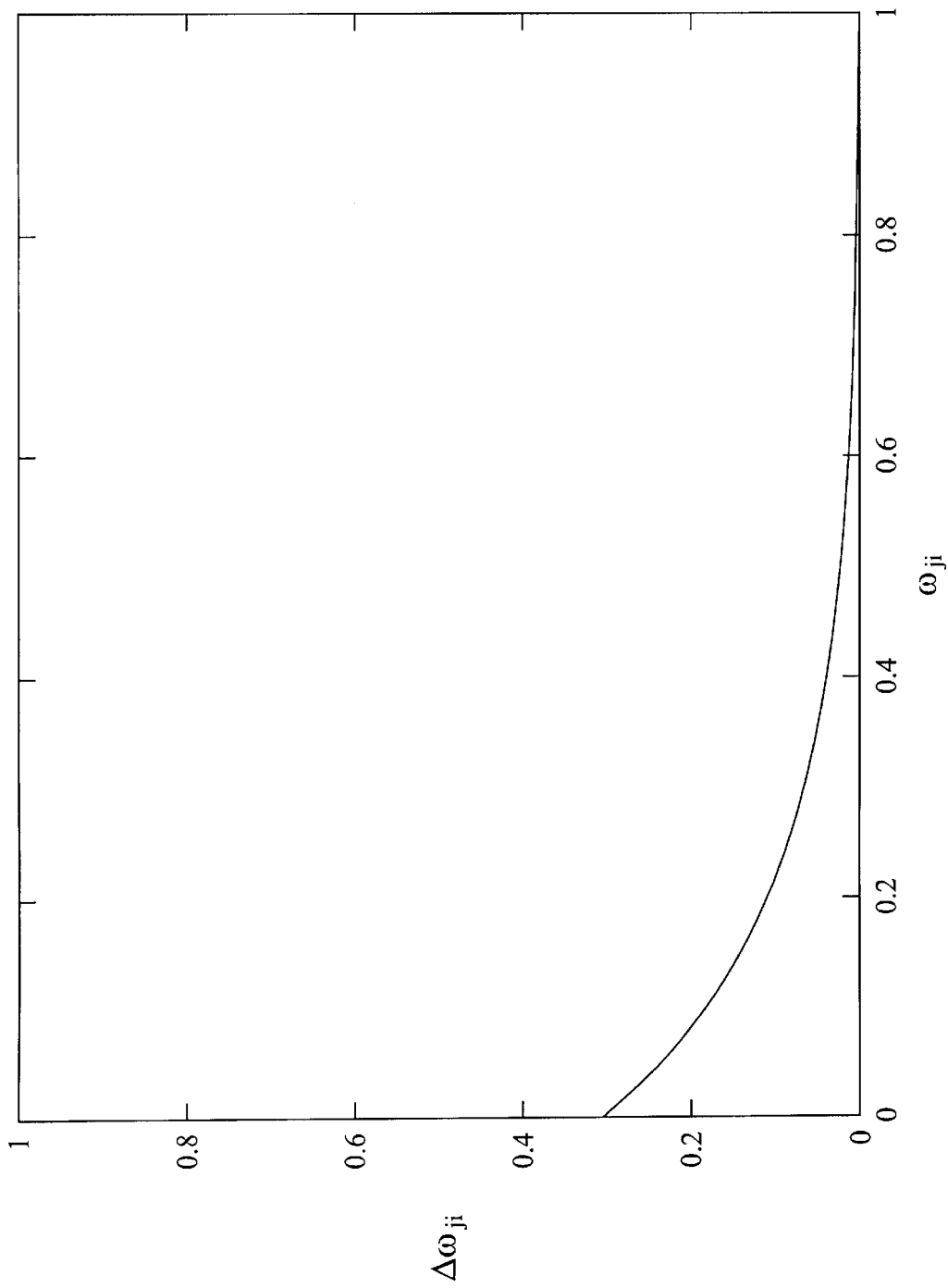
FIG. 13 is a graph showing a relationship between a signal transmitting efficiency of an internal signal inputting element and a variation thereof through one learning process.

Next, this invention is explained in more detail by using an example for executing specific learning and recalling processes. At this time, it is assumed that the associative storage is constituted by six storage elements. The method for determining the internal signal transmitting efficiency $\Delta \omega_{ji}$ of the internal signal inputting element of the i-th storage element, which receives the internal signal from the j-th storage element, is defined as follows in this specific example:

$$\Delta \omega_{ji} = m\omega \times \frac{\exp k\omega \times \{(1 - \omega_{ji}) - a\omega\}}{1 + \exp k\omega \times \{(1 - \omega_{ji}) - a\omega\}} \quad (5)$$

wherein, $m\omega$, $k\omega$ and $a\omega$ are constants. In this specific example, $1.0 \times 10^6$, 5.0 and 4.0 are used for the constants $m\omega$, $k\omega$ and $a\omega$, respectively. The constant $m\omega$ relates to the magnitude of the $\Delta \omega_{ji}$, and the value $\Delta \omega_{ji}$ is in proportion to the constant $m\omega$. Since $k\omega$ is a constant for defining relationship between the magnitude of the $\omega_{ji}$ and the $\Delta \omega_{ji}$, if the constant $k\omega$ is increased, $\Delta \omega_{ji}$ corresponding to larger $\omega_{ji}$ is increased or if the constant kw is decreased, $\Delta \omega_{ji}$ corresponding to larger $\omega_{ji}$ is decreased. Although both $a\omega$ and $m\omega$ are also constants relating to the magnitude of $\Delta \omega_{ji}$, $\Delta \omega_{ji}$ is in inverse proportion to $a\omega$. The graph showing the relationship between $\Delta \omega_{ji}$ and $\omega_{ji}$ is indicated in FIG. 13. As shown in FIG. 13, if $\omega_{ji}$ is decreased, $\Delta\omega_{ji}$ is increased and if is increased, $\Delta\omega ji$ is decreased. Thus, it is understood that when the associative storage has not been learned, the $\omega_{ji}$ is drastically changed and the $\omega_{ji}$ tends not to change drastically in accordance with the repeating of the learning process. By using this characteristic, the producing of associative relationships among events within a few learning processes and reflection of the frequency of the learning processes on the associative relationship are both realized simultaneously. The method for determining the value of $\Delta\omega_{ji}$ is not limited to the function defined in equation (5); any method for defining the relationship between $\Delta\omega_{ji}$ and $\omega_{ji}$ are acceptable.

The function $U_i=f(X)$, which determines the status of the i-th storage element in equation (3), is defined by the following equation in this embodiment:

$$f(x) = \begin{cases} \alpha \times R_i + \dfrac{\beta \times \sum_{i \neq j} H_{ji} \times \omega}{n_{umi}} & (> \theta i) \\ 0 & (< \theta i) \end{cases} \quad (6)$$

$$o_i = m\theta \times \frac{\exp\{k\theta \times (n_{umi} - a\theta)\}}{1 + \exp\{k\theta \times (n_{umi} - a\theta)\}} \quad (7)$$

wherein, $R_i$ is a recalling signal and $\alpha$ and $\beta$ are constants. In this example, both $\alpha$ and $\beta$ are set to 1. It is possible to change the weight of the inputted signal from another storage element and the recalling signal at the recalling process by varying the constants $\alpha$, $\beta$. The $n_{umi}$ is the number of internal signal inputting elements that are currently receiving an internal signal of the i-th storage element. The $\theta_i$ is the threshold value necessary to turn the i-th storage element to the ON-state. The $O_i$ is determined by equation (7) in this example. In equation (7), m$\theta$, k$\theta$ and a$\theta$ are constants. In this example, m$\theta$, k$\theta$ and a$\theta$ are set to 1.0, 1.0 and 1.5, respectively. The m$\theta$ is a constant relating to a magnification of $\theta_i$, and if it is required to increase the threshold value $\theta_i$, m$\theta$ may be increased. The k$\theta$ is a constant defining the relationship between the $n_{uni}$ and $\theta_i$, and the threshold value $\theta_i$ is increased as the value k$\theta$ is increased when there are a large number of inputted signals. Although a$\theta$ is a constant relating to the magnification of $O_i$ similar to m$\theta$, a$\theta$ and $\theta_i$ has a monotone decreasing relationship contrary to that with m$\theta$. The state of the storage element is easily determined based on the intensity of the inputted signal through a hypothetical internal signal inputted element, which is defined by dividing the sum of the total inputted internal signals by $n_{umi}$. The state of the storage element can also be determined by using the total number of the internal signal inputted elements that are currently receiving internal signals, as an alternative way. However, since the storage elements tend not to be in the ON-state easily unless many inputted signals are inputted thereto, each storage element tends to indicate strong cooperativeness with each other. In this case, since the associative relationship among events stored in respective storage elements tend to be relatively weak and the recalling process might not be executed in high efficiency, such a method is not utilized in this example. However, such a method, i.e. using the total number of the internal signal inputted elements, is considered as a better way when the associative storage mainly treats events having a characteristic that one event has a relationship with many other events. The value $O_i$ increases as the value $n_{umi}$ increases, in other words, the storage device tends not to be in the ON-state as many signals are inputted thereto. The $\theta_i$ is set so that the storage device tends to be in the ON-state when the number of inputted signals are relatively small and the storage device tends not to be in the ON-state when the number of inputted signals are relatively large because if the storage device is set to be easily in the ON-state, since the number of storage elements that receive many internal signals is usually increased during the recalling process, the recalling process might be repeated endlessly and if the threshold value is set to be relatively high and the internal signal is outputted only from one storage element, the recalling process might not be executed efficiently despite the previous learning process. The method for defining the state of the storage element is not limited to the above function of equation (7); it may be any method for determining the relationship between ON and OFF-states of the storage element and the internal inputted signals.

The $O_i=g(x)$ in equation (4) is defined by the following equation:

$$g(x) = \begin{cases} U_i \text{ (ON-state)} \\ 0 \text{ (OFF-state)} \end{cases} \quad (8)$$

In this equation, the state of the storage element itself is defined as internal inputted signal. In this example, the state of the respective storage element and the respective internal outputting signal have an analogue value from 0 to 1 and it is defined that if the value of the state of the element is as close to 1, the event stored in the storage element is considered to be recalled as well. The method for determining the internal outputting signal of the storage element is not limited to the function indicated in the function of equation (8); it may be any method for defining the internal outputting signal as a monotone increasing characteristic corresponding to the state of the storage element.

Each storage element is set to output an internal signal having magnitude 1 through the internal signal outputting element when a learning signal or a recalling signal is inputted thereto. In addition, to avoid oscillation of the associative storage, a non-response term is set to respective storage elements so as not to respond to any inputted signal through the internal signal inputted element until a new learning signal or recalling signal is inputted to the associative storage element after the storage element is turned to the ON-state.

The aforementioned associative storage and storage elements may be configured by electric circuits as a hardware, or configured by algorithms of a computer as a software.

Figure 14:
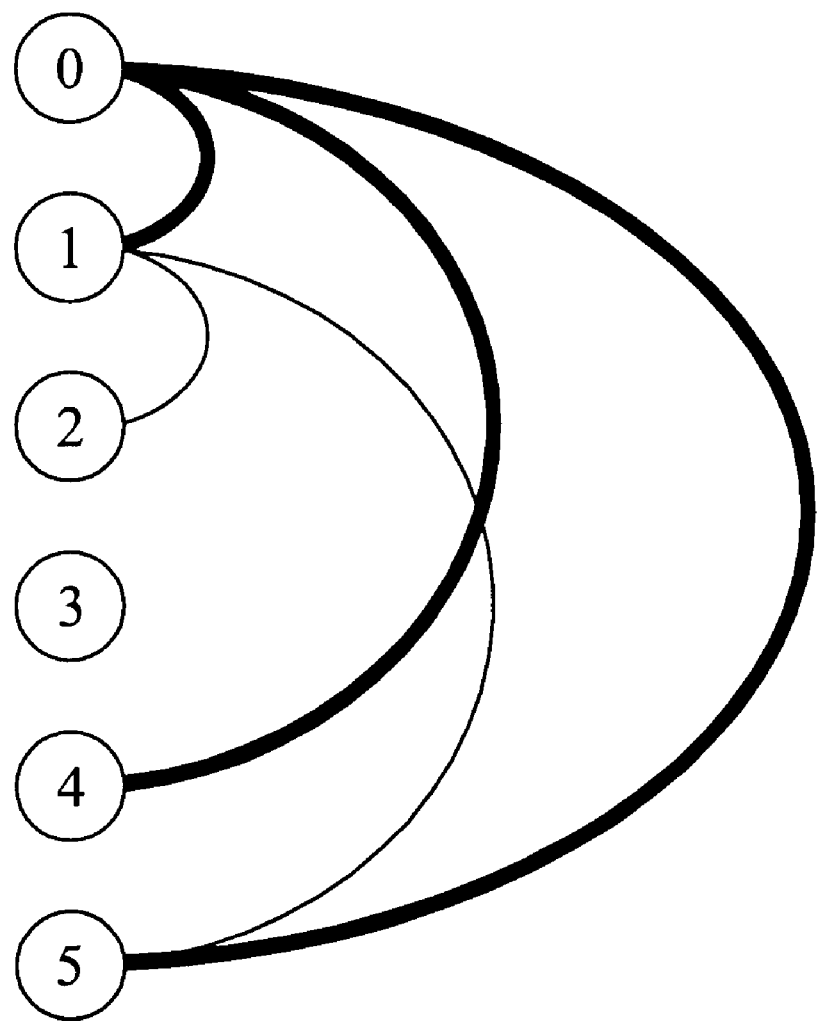
FIG. 14 shows a learning result of one embodiment of the present invention.

The results of the recalling process by using the above embodiment of the present invention is explained hereinafter. The initial values of the signal transmitting efficiency of the internal signal inputting elements of respective six storage elements (0th to 5th) are set to zero in this example. In this situation, the relationship disclosed in FIG. 14 is learned by the associative storage of this embodiment. In FIG. 14, line width is in proportion to the strength of the associative relationship between storage elements. As a results of the learning process, the signal transmitting efficiency of the internal signal inputting element of the respective six storage element are as indicated in FIG. 15. The results of the recalling process using the relationship of the signal transmitting efficiency of the internal signal inputting element in FIG. 15 is also shown in FIG. 16. It is understood from FIG. 16 that the recalling process is proportionally executed close to the relationship indicated in FIG. 14. The magnitude of recalled outputting signals are also in proportion to magnitude of signal transmitting efficiencies of the respective internal signal inputted elements in FIG. 14 that have been enhanced through the learning process. When $R_1$ is inputted thereto, the second storage element is not recalled despite the element is considered to be learned, or vice versa. This is why the magnitude of $\omega_{12}$ and $\omega_{21}$ are both relatively small sufficient to make the other element turn to the ON-state.

The signal transmitting efficiency of the internal signal inputted element when the relationship between the 0th storage element and the 5th storage element is enhanced through additional learning processes from the state of FIG. 16 is shown in FIG. 17(a) and a result of an additional recalling process when a recalling signal is inputted to the 5th storage element is also shown in FIG. 17(b). It is understood that only $\omega_{05}$ and $\omega_{50}$ are enhanced through the learning process from FIG. 17(a). When $R_5$ is inputted thereto, it is also understood that the 0th storage element, which has been enhanced in an associative relationship with the 5th storage element, is strongly recalled compared to that of FIG. 16 and the 1st storage element, which has a strong relationship with the 0th storage element, is also recalled.

In the above embodiment, the controller of the signal transmitting efficiency is installed at a respective internal signal inputting element; however, the controller may be installed at respective internal signal outputting elements or signal transmitting mediums therebetween.

According to this invention, the relationship among events may be learned and recalled randomly by the associative storage. In addition, associative relationship are newly produced and the relationship with the previously stored events are automatically updated therein by inputting learning signals corresponding to previously stored events. Therefore, different from the conventional associative storage, which requires a lot of time for executing a learning process or which has only a limited function, the associative storage of the present invention is able to learn and add new associative relationships consecutively. Also, the associatively stored events are retrieved by inputting a recalling signal corresponding to the stored events. The relationship among the events may be enhanced through the frequent learning process.

What is claimed is:

1. An associative storage comprising:
   a plurality of storage elements, each of said plurality of storage elements having at least one internal signal outputting element for outputting an internal outputting signal toward another of said plurality of storage elements and at least one internal signal inputting element for receiving at least one internal inputting signal outputted from another of said plurality of storage elements;
   a learning signal inputting element for each respective storage element for inputting a learning signal thereto;
   a recalling signal inputting element for each respective storage element for inputting a recalling signal thereto;
   an internal state switching element for each respective storage element for turning an internal state of said respective storage element to an ON state when either the learning signal or the recalling signal is inputted thereto and/or a sum of the at least one internal inputting signal exceeds a threshold value while the internal state is kept in an OFF state, wherein the associative storage element outputs an internal outputting signal toward another of said plurality of storage elements when the internal state is turned ON; and
   an enhancing element for the at least one internal signal inputting element for enhancing a signal transmitting efficiency thereof when the internal state of the storage element is turned ON and the at least one internal signal inputting element receives the at least one internal inputting signal from another storage element.

2. The associative storage of claim 1, wherein the enhancing element enhances the signal transmitting efficiency by a constant amount with the inputting of the learning signal.

3. The associative storage of claim 1, wherein the enhancing element enhances the signal transmitting efficiency using the equation:

$$\omega(t)=\omega(t-1)+\Delta\omega$$

wherein $\omega(t)$ is the signal transmitting efficiency at time t, $\omega(t-1)$ is the signal transmitting efficiency at time t-1, and $\Delta\omega$ is a change in the signal transmitting efficiency.

4. The associative storage of claim 3, wherein $\Delta\omega$ is set in proportion to $\omega(t-1)$.

5. The associative storage of claim 3, wherein when $\omega(t-1)$ is large, $\Delta\omega$ is small and when $\omega(t-1)$ is small, $\Delta\omega$ is large.

6. The associative storage of claim 1, wherein the internal state switching element comprises an OR circuit, the learning signal inputting element comprises a first terminal of the OR circuit and the recalling signal inputting element comprises a second terminal of the OR circuit.

7. The associative storage of claim 6, wherein the internal state switching element further comprises a multiplier, an adder and a level detector, and
   wherein the at least one internal inputting signal received from the at least one internal signal inputting element is input to the multiplier which multiplies the at least one internal inputting signal by the signal transmitting efficiency, the multiplied at least one internal inputting signal being input to the adder which adds the multiplied at least one internal inputting signal to generate an output signal, and the level detector classifies the output signal into one of a plurality of levels.

8. The associative storage of claim 7, wherein the output from the OR circuit is provided to another of the plurality of storage elements and also to the enhancing element to update the signal transmitting efficiency used by the multiplier.

9. An associative storage comprising:
   a learning signal inputting element for inputting a learning signal;
   a recalling signal inputting element for inputting a recalling signal;
   a plurality of storage elements, each storage element having at least one internal signal outputting element for outputting an internal outputting signal toward another of said plurality of storage elements and at least one internal signal inputting element for receiving at least one internal inputting signal outputted from another of said plurality of storage elements;
   an internal state switching element for each respective storage element for turning an internal state of the respective storage element to an ON state when either the learning signal from the learning signal inputting element or the recalling signal from the recalling signal inputting element is inputted thereto and/or a sum of the at least one internal inputting signal exceeds a threshold value while the internal state is kept in an OFF state, wherein the associative storage element outputs the internal outputting signal toward another of said plurality of storage elements when the internal state is turned ON; and an enhancing element for the at least one internal signal inputting element for enhancing a signal transmitting efficiency thereof when the internal state of the storage element is turned ON and the at least one internal signal inputting element receives the at least one inputting signal from another storage element.

10. The associative storage of claim 9, wherein the enhancing element enhances the signal transmitting efficiency using the equation:

$$\omega(t)=\omega(t-1)+\Delta\omega$$

wherein $\omega(t)$ is the signal transmitting efficiency at time t, $\omega(t-1)$ is the signal transmitting efficiency at time t−1, and $\Delta\omega$ is a change in the signal transmitting efficiency, and wherein when $\omega(t-1)$ is large, $\Delta\omega$ is small and when $\omega(t-1)$ is small, $\Delta\omega$ is large.

11. The associative storage of claim 9, wherein the internal state switching element comprises an OR circuit, a multiplier, an adder and a level detector, the learning signal inputting element comprises a first terminal of the OR circuit and the recalling signal inputting element comprises a second terminal of the OR circuit, and wherein the at least one internal inputting signal received from the at least one internal signal inputting element is input to the multiplier which multiplies the at least one internal inputting signal by the signal transmitting efficiency, the multiplied at least one internal inputting signal being input to the adder which adds the multiplied at least one internal inputting signal to generate an output signal, the level detector classifies the output signal into one of a plurality of levels, and wherein the output from the OR circuit is provided to another of the plurality of storage elements and also to the enhancing element to update the signal transmitting efficiency used by the multiplier.

12. A first associative storage element coupled to a second associative storage element, said first associative storage element comprising:

at least one internal signal outputting element for outputting an internal outputting signal toward the second storage element;

at least one internal signal inputting element for receiving at least one internal inputting signal;

a learning signal inputting element for inputting a learning signal thereto;

a recalling signal inputting element for inputting a recalling signal thereto;

an internal state switching element for turning an internal state of the first associative storage element to an ON state when either the learning signal or the recalling signal is inputted thereto and/or a sum of the at least one internal inputting signals exceeds a threshold value while the internal state is kept in an OFF state, wherein the associative storage element outputs the internal outputting signal toward the second associative storage element when the internal state is turned ON; and an enhancing element for enhancing a signal transmitting efficiency of a respective internal signal inputting element when the internal state of the first associative storage element is turned ON and the internal signal inputting element receives the at least one internal inputting signal.

13. The associative storage of claim 12, wherein the enhancing element enhances the signal transmitting efficiency using the equation:

$$\omega(t)=\omega(t-1)+\Delta\omega$$

wherein $\omega(t)$ is the transmitting efficiency at time t, $\omega(t-1)$ is the transmitting efficiency at time t−1, and $\Delta\omega$ is a change in the transmitting efficiency, and wherein when $\omega(t-1)$ is large, $\Delta\omega$ is small and when $\omega(t-1)$ is small, $\Delta\omega$ is large.

14. The associative storage of claim 12, wherein the internal state switching element comprises an OR circuit, a multiplier, an adder and a level detector, the learning signal inputting element comprises a first terminal of the OR circuit and the recalling signal inputting element comprises a second terminal of the OR circuit, and wherein the at least one internal inputting signal received from the at least one internal signal inputting element is input to the multiplier which multiplies the at least one internal inputting signal by the signal transmitting efficiency, the multiplied at least one internal inputting signal being input to the adder which adds the multiplied at least one internal inputting signal to generate an output signal, and the level detector classifies the output signal into one of a plurality of levels.

15. An associative storing method comprising the steps of:

inputting a learning signal to at least two of a plurality of storage elements, turning respective storage elements to an ON-state in response to the storage elements having received the inputted learning signal, wherein said respective storage elements are always turned to the ON-state when the learning signal is received by the respective storage elements;

exchanging a plurality of internal signals among storage elements of the plurality of storage elements in response to the turning ON of respective storage elements; and enhancing a signal transmitting efficiency of respective internal signals in response to the exchanging of the internal signals, wherein the enhancing step is only performed when the respective storage element is turned to an ON state and receives at least one internal signal of the plurality of internal signals, from another of the plurality of storage elements.

16. An associative storing method comprising the steps of:

inputting a learning signal to at least two of a plurality of storage elements, turning respective storage elements to an ON-state in response to the storage elements having received the inputted learning signal, wherein said respective storage elements are always turned to the ON-state when the learning signal is received by the respective storage elements;

exchanging a plurality of internal signals among storage elements of the plurality of storage elements in response to the turning ON of respective storage elements:

enhancing a signal transmitting efficiency of respective internal signals in response to the exchanging of the internal signals;

inputting a recalling signal to at least one of the plurality of storage elements;

turning the at least one storage element to an ON-state in response to the inputting of the recalling signal;

outputting at least one internal signal of the plurality of internal signals, toward another storage element in response to the ON-state of the at least one storage element; and turning ON said another storage element in response to receiving the at least one internal signal when the at least one internal signal exceeds a threshold value, wherein the step of enhancing is performed for respective storage elements only when the storage element is turned ON and receives at least one internal signal of the plurality of internal signals, from another storage element.

17. An associative recalling method comprising the steps of:

inputting a recalling signal to at least one of a plurality of storage elements storing associative memories;

turning the at least one of the plurality of storage elements to an ON-state in response to receiving the inputted recalling signal wherein the at least one of the plurality of storage elements is always turned to an ON-state when the recalling signal is received;

outputting an internal signal toward another storage element of the plurality of storage elements in response to the ON-state of the at least one storage element;

turning ON said another storage element in response to the internal signal when the internal signal exceeds a threshold value;

inputting a learning signal to at least two of the plurality of storage elements;

turning respective storage elements to an ON-state in response to the inputting of the learning signal;

exchanging a plurality of internal signals among storage elements of the plurality of storage elements in response to the turning ON of respective storage elements; and enhancing a signal transmitting efficiency of respective storage elements when the storage elements are turned ON and receive at least one internal signal of the plurality of internal signals, from another storage element.

* * * * *